(12) United States Patent
Kath

(10) Patent No.: US 6,533,317 B2
(45) Date of Patent: Mar. 18, 2003

(54) RESTRAINING DEVICE WITH DYNAMIC "DANGER" ZONE

(75) Inventor: Christoph Kath, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/949,975

(22) Filed: Sep. 10, 2001

(65) Prior Publication Data

US 2002/0063418 A1 May 30, 2002

Related U.S. Application Data

(63) Continuation of application No. PCT/EP00/00817, filed on Mar. 2, 2001.

(30) Foreign Application Priority Data

Mar. 10, 1999 (DE) .......................................... 199 10 592

(51) Int. Cl.$^7$ .............................................. B60R 21/32
(52) U.S. Cl. ...................................... 280/735; 180/271
(58) Field of Search ................................ 280/735, 734; 180/268, 271

(56) References Cited

U.S. PATENT DOCUMENTS

| | | | | |
|---|---|---|---|---|
| 5,330,226 A | | 7/1994 | Gentry et al. ................ | 280/735 |
| 5,446,661 A | * | 8/1995 | Gioutsos et al. ........ | 364/424.05 |
| 5,626,359 A | * | 5/1997 | Steffens, Jr. et al. ......... | 280/735 |
| 5,835,873 A | * | 11/1998 | Darby et al. ................... | 701/45 |
| 6,018,693 A | * | 1/2000 | Blackburn et al. ............. | 701/45 |
| 6,151,540 A | * | 11/2000 | Anishetty ...................... | 701/45 |
| 6,168,198 B1 | * | 1/2001 | Breed et al. ................. | 280/735 |
| 6,220,627 B1 | * | 4/2001 | Stanley ........................ | 280/735 |
| 6,302,438 B1 | * | 10/2001 | Stopper, Jr. et al. ......... | 280/735 |
| 6,341,252 B1 | * | 1/2002 | Foo et al. ...................... | 701/45 |

FOREIGN PATENT DOCUMENTS

| | | |
|---|---|---|
| DE | 4112579 | 10/1991 |
| DE | 5330226 | 6/1994 |
| DE | 19610833 | 9/1996 |
| DE | 19814678 | 10/1998 |
| DE | 19814691 | 3/1999 |

OTHER PUBLICATIONS

Phen et al., "Advanced Air Bag Technology Assessment—Section 5: Occupant Protection Advanced Technology", Jet Propulsion Laboratory, Apr. 1998.

\* cited by examiner

Primary Examiner—Paul N. Dickson
Assistant Examiner—Faye M. Fleming
(74) Attorney, Agent, or Firm—Baker Botts LLP

(57) ABSTRACT

An air bag restraint system includes a controller which is responsive to first sensor signals representing the position of an occupant and second sensor signals. The controller defines a danger zone according to the second sensor signals representing vehicle conditions, and inhibits air bag activation if the first sensor signal indicate the occupant is within the defined danger zone.

10 Claims, 1 Drawing Sheet

RESTRAINING DEVICE WITH DYNAMIC "DANGER" ZONE

This is a continuation of application No. PCT/EP00/001817, filed Mar. 2, 2001.

BACKGROUND OF INVENTION

The invention relates to a restraining device comprising an air bag, a controller controlling the ignition time and/or the fill of the air bag, and responsive to sensor signals characterizing the position of a vehicle occupant from at least one sensor element. The sensor signals suppress the release of the air bag if the controller, on the basis of the sensor signals, identifies a critical position of the occupant in a "danger" zone of the air bag.

In know arrangements provision is made so that the controller evaluates the sensor signals characterizing the sitting position of the occupant, particularly whether the occupant is in a previously defined danger zone, determined substantially by the range of swing of an air bag flap normally covering the air bag, and an additional, more extensive range determined essentially by the deploying characteristic of the air bag. In that case, the controller of the known arrangement device assumes that in event of a release of the air bag taking place at this time, the occupant would be seriously endangered, and therefore generates a control signal inhibiting the release of the air bag.

This procedure has the disadvantage that the controller reacts statically to the pre-defined values of the danger zone and therefore not flexibly enough to the actual process of the accident.

It is an object of the invention to provide a restraining device that provides adaptation of the control signal of the controller to suppresses release of the air bag according to actual conditions.

SUMMARY OF THE INVENTION

According to the invention, the controller of a restraining device defines a danger zone dynamically, as a function of parameters supplied to it from one or more sensors.

The arrangement according to the invention has the advantage that there is provided a better adaptation of the release behavior of the air bag to the actual process of the accident. In the case of accidents of minor severity—as an example of a parameter external to the vehicle—provision is advantageously made so that the controller bases its decision whether to generate a control signal inhibiting release of the air bag or not on, a larger danger zone, whereas with a greater severity of accident, this decision is based on a dynamic danger zone substantially smaller than the pre-defined static danger zone; that is, in the case of the restraining device according to the invention, in the case last mentioned, the air bag is also released if the occupant of the vehicle is in an "out-of-position" attitude or even in a "critical out-of-position" attitude.

An advantageous refinement of the invention provides that the weight of the occupant—that is, a parameter internal to the vehicle—is sensed, and a corresponding sensor signal is supplied to the controller of the restraining device according to the invention, and incorporated in the calculation of the dynamic danger zone.

Another advantageous refinement of the invention provides that the speed of the vehicle and/or the acceleration of the vehicle is incorporated in the calculation of the dynamic danger zone. According to further advantageous refinements of the invention, provision may advantageously be made so that the direction of motion and/or the place of impact of the occupant are incorporated in the determination of the dynamic danger zone.

Other details and advantages of the invention will be found in the embodiment about to be described by way of example with reference to the figure.

DESCRIPTION OF THE INVENTION

Figure 1:
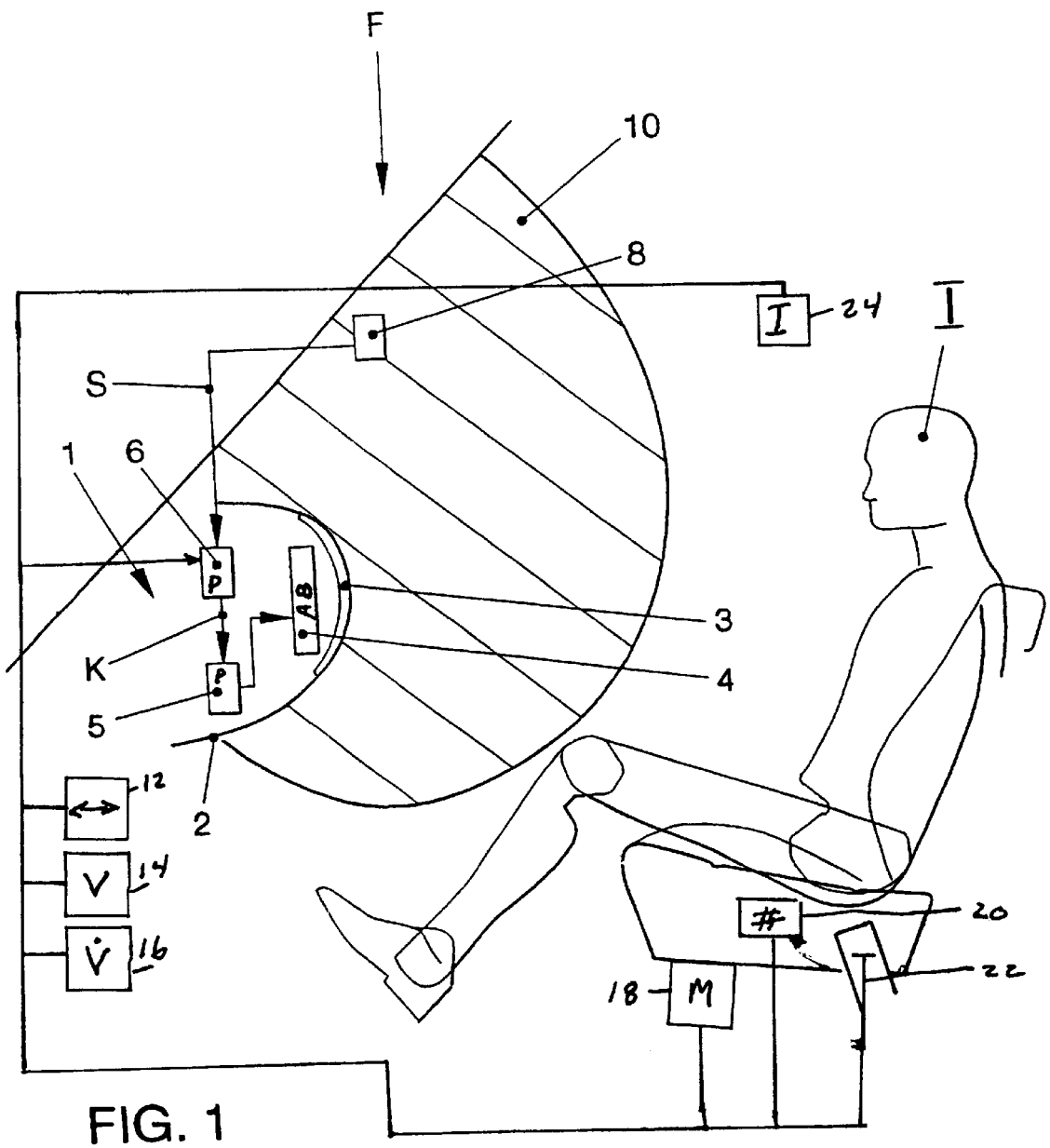
FIG. 1 shows a schematic representation of an air bag system according to the invention.

FIG. 1 represents a restraining device generally marked 1, arranged in a dashboard 2 of a vehicle F, in particular a motor vehicle. The restraining device I comprises an air bag 4 normally covered by a flap 3, the ignition time and/or the fill of the air bag 4 being controlled by an air bag controller 5. Further, a second controller 6 is provided to which a sensor signal S is supplied from a sensor 8 detecting the position of an occupant 1. The controller 6 generates a control signal K preventing release of the air bag 4, which is supplied to the controller 5 if the occupant 1 is within a danger zone 10, as a rule an "out-of-position" or a "critical out-of-position" attitude. Such a restraining system 1 is known per se and therefore need not be described in detail. However, it should be stated that in the known restraining devices, the danger zone 10, that is, the region in which as a rule the danger of injury due to the deploying air bag 4 and/or the air bag flap 3 to an occupant 1 located in this zone exceeds the protection actually obtainable from the air bag 4, is statically determined and stored in the controller 6.

By contrast, the restraining device 1 described, in advantageous manner, provides that the danger zone 10 is dynamically determined by the controller 6 as a function of conditions in the vehicle or the actual process of the accident. The term 'process of the accident' is here to be understood as meaning the totality of parameters, internal and/or external to the vehicle, that are sensed by sensor elements of the vehicle F and supplied to the controller 6.

To this end, it is provided that the controller 6 is supplied for example with one or more of sensor signals described below from corresponding sensors These additional sensors means are usually already present in contemporary vehicles, to provide the controller 5 with suitable input signals to control the ignition time and/or the fill of the air bag 4 in a manner adapted to the course of the accident. In this connection, we refer for example to WO 97/21566, describing an air bag system with variable release time.

The sensor signals supplied to the controller 6—for example and not exclusively—are the following parameters.

a) Parameters External to the Vehicle

In an accident of only slight severity, the controller 6 enlarges the dynamic danger zone 10 relative to the static danger zone. That is, the dynamic danger zone 10 so generated extends farther away from the dashboard 2 and the air bag flap 3, with the result that the controller 6 produces a control signal K preventing release of the air bag 4 even when the vehicle occupant is within the static danger zone. What this accomplishes is that in a mild accident, a release of the air bag 4 unnecessary in this case is prevented, thereby reducing costs of repairs.

By contrast, the controller 6 in an accident of high severity reduces the dynamic danger zone 10 relative to the static danger zone, so that a release of the air bag 4 will take place even in the case that the vehicle occupant 1 is within the static danger zone, namely, as a rule, in an out-of-position or a critical out-of-position attitude. In the extreme case of an especially highly severe accident, provision may be made for the air bag 4 to deploy even if the vehicle occupant 1 is already within the range of swing of the air bag flap 3. Behind this method of control of the air bag 4 is the thought that in very severe accidents, a collision with the air bag flap 3 is the lesser evil compared to an impact of the occupant 1 on the dashboard 2 not cushioned by the air bag 4.

b) Parameters Internal to the Vehicle

In similar manner, it may likewise be provided that instead of the accident parameters external to the vehicle—for example the severity of the accident—or additional parameters internal to the vehicle may be used, for example the speed of the vehicle as measured by speedometer 14 and/or the magnitude of the negative acceleration of the vehicle as measured by accelerometer 16 and/or the direction of the vehicle, a determined by sensor 12 or location of impact of the occupant as measured by impact sensor 24 and/or the seat belt status as measured by sensor 22 enter into the determination of the dynamic danger zone.

Likewise it is possible, and in numerous cases desirable, that the occupant's weight be detected by sensor 20 and a sensor signal characterizing this internal parameter be supplied to the controller 6. Other parameters internal to the vehicle that may be sensed and supply corresponding sensor signals to the control device 6 are seat occupancy classification, such as for example a person has sat down on the vehicle seat as measured by sensor 20 or a child seat has been arranged, and/or the position of the occupant seat, especially in relation to its longitudinal placement, back rest inclination and seat height as measured by seat positioner 18.

It will be clear to those skilled in the art that the enumeration of parameters involved in the determination of the dynamic danger zone is only exemplary in nature, and that the general consideration behind them is to enable the controller 6 to decide in terms of pre-program criteria whether in the case of a sensed accident and a likewise detected position of the vehicle occupant 1 the danger of injury due to a deployment of the air bag 4 at this time or the out-swinging air bag flap 3 in relation to the protection provided by the deploying air bag 4 outweighs the corresponding risk of injury to the vehicle occupant or not.

Those skilled in the art will recognize that a single processor may be used top provide the functions of controllers 5 and 6, and that combinations of sensor signals may be used to control the definition of the danger zone.

While there have been described what are believed to be the preferred embodiments of the invention, those skilled in the art will recognize that other and further changes can be made thereto without departing from the spirit of the invention, and it is intended to claim all such changes and modifications as fall within the true scope of the invention.

What is claimed is:

1. An air bag restraining system for a motor vehicle comprising:

a first sensor providing a first sensor signal representing the positions of a vehicle occupant;

a second sensor providing a second sensor signal representing a parameter relating to deployment of an air bag;

an air bag arranged to inflate in response to a trigger signal; and at least one processor for defining a danger zone having a size which is variable according to said second sensor signal, responsive to said first sensor signal to determine if said vehicle occupant is within said defined danger zone, and for providing said trigger signal if said occupant is not within said danger zone.

2. A system according to claim 1 wherein said second sensor provides a second sensor signal characterizing the severity of an accident, and wherein said processor defines a small danger zone for a severe accident and a large danger zone for a low severity accident.

3. A system according to claim 1 wherein said second sensor provides a sensor signal representing vehicle speed.

4. A system according to claim 1 wherein said second sensor provides a sensor signal representing negative acceleration of the vehicle.

5. A system according to claim 1 wherein said second sensor provides a sensor signal representing direction of vehicle motion.

6. A system according to claim 1 wherein said second sensor provides a sensor signal representing a location of an impact on the vehicle.

7. A system according to claim 1 wherein said second sensor provides a sensor signal representing seat belt use by a vehicle occupant.

8. A system according to claim 1 wherein said second sensor provides a sensor signal representing weight of a vehicle occupant.

9. A system according to claim 1 wherein said second sensor provides a sensor signal representing seat occupancy.

10. A system according to claim 1 wherein said second sensor provides a sensor signal representing position of a vehicle seat.

* * * * *